April 16, 1935. R. D. THOMPSON 1,998,176
COUPLING DEVICE
Filed July 3, 1933

Ralph D. Thompson
INVENTOR

BY C. A. Harpman
ATTORNEY

Patented Apr. 16, 1935

1,998,176

UNITED STATES PATENT OFFICE 1,998,176

COUPLING DEVICE

Ralph D. Thompson, Andover, Ohio

Application July 3, 1933, Serial No. 678,821

1 Claim. (Cl. 285—170)

This invention relates to a coupling device.

The principal object is to provide a coupling device especially constructed for the purpose of connecting a grease gun, or the like, to a grease fitting, such as a zerk, in common use in the construction of automobiles.

This device is so constructed as to provide for a rapid and positive attachment to a grease gun and to a grease fitting such as a zerk. The device also provides an easy and rapid means for detaching from the grease gun and grease fitting when not in use.

In greasing automobiles where tapered fittings are installed it has been the practice to provide a flared connecting part carried on the grease gun in order that the same may telescope the tapered end of the grease fitting. In many fittings which are greased in this manner, it has been learned that the operator does not have sufficient strength to hold the flared connecting part of the grease gun securely on the grease fitting so as to force the grease into the bearing to be greased. In order to overcome this objectionable feature, a positive gripping means is employed in attaching the device to the tapered grease fitting and to the grease gun thereby making it possible to hold the grease gun on the grease fitting without pressure being exerted on the grease gun by the operator.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

The invention is illustrated in the accompanying drawing, wherein.

Figure 4:
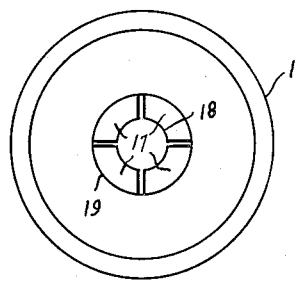
Figure 4 is an end view of the device.
Figure 1:
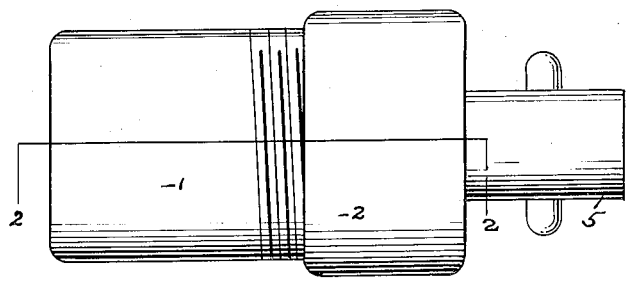
Figure 1 is a side elevation of the device.

By referring to the drawing it will be seen that there is provided a casing 1. This casing 1 is cylindrical in form and has one end formed with threads for the reception of a threaded cap 2. This cap 2 has a central opening 3 and a connecting member 5. The connecting member 5 is for the purpose of attaching the device to an ordinary grease gun. This connecting member 5 has an opening 4 which is in alignment with the central opening 3 of the cap 2.

Figure 2:
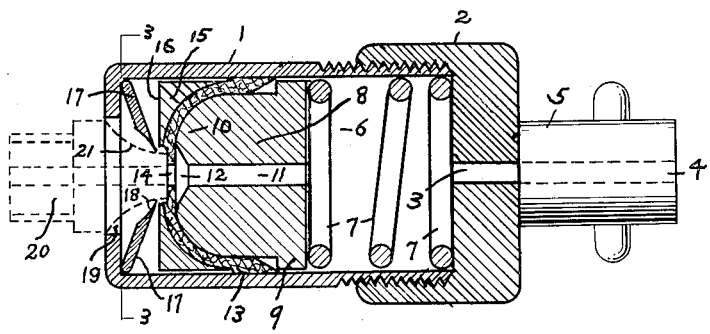
Figure 2 is a cross section taken on line 2—2 of Figure 1 and also showing a grease fitting in dotted line showing position of the device in relation to the grease fitting when in an attached position upon the grease fitting.
Figure 3:
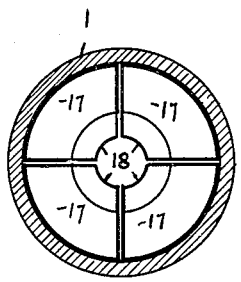
Figure 3 is a cross section taken on line 3—3 of Figure 2 showing a complete cross section of the device on this line.

By referring to Figure 2 it will be seen that the casing 1 forms a chamber 6. Within this chamber 6 there is positioned a coil spring 7, one end of which rests upon the interior of the cap 2 and the other end against a lower portion of a piston member 8 which is provided with a peripheral flange 9. This piston member 8 has a dome shaped end 10. The piston member 8 is also provided with a central channel 11 which is enlarged into a saucer shaped recess 12 at the dome shaped end 10 for the purpose of forming a grease cushion. It will also be seen that there is provided a pliable cup shaped member 13 fitting over the dome shaped end 10 and having a central opening 14 which is in alignment with the central channel 11. This cup shaped member 13 is preferably made of leather. It will also be seen that there is provided a guide member 15 formed to fit over the cup shaped member 13. This guide member 15 is provided with a central opening substantially as large in diameter as the saucer shaped recess 12. It will also be seen that this guide member 15 has a plane surface 16 upon which a plurality of jaws 17 normally rest forming a chuck. It will be seen that these jaws 17 are provided with a circular gripping edge 18.

In operating the device the connecting member 5 is attached to an ordinary grease gun. The device is then placed so that a central opening 19 of the casing 1 telescopes a grease fitting 20, which is ordinarily known to the art as a zerk fitting. This grease fitting 20 is provided with a tapered connection part 21. The grease fitting 20 forces the pliable cup shaped member 13 down into the saucer shaped recess 12. The force exerted by the operator in placing the device in position on the grease fitting 20 will cause the piston member 8, the pliable cup shaped member 13, and the guide member 15 to be moved inwardly against the coil spring 7. At the same time the tapered connection part 21 of the grease fitting 20 will carry the inner ends of the jaws 17 inwardly. The grease under pressure is then released into the chamber 6 and carried into the saucer shaped recess 12, filling the saucer shaped recess 12 and exerting a force upon the piston member 8, thereby carrying the guide member 15 back against the inner ends of the jaws 17 causing the same to grip securely the tapered connection part 21 of the grease fitting 20. As the grease builds up a pressure in the chamber 6 and in the saucer shaped recess 12 the grease is caused to be forced into the grease fitting 20 and at the same time a pull is exerted against the tapered connection part 21 of the grease fitting 20 thereby forcing the jaws 17 into a gripping relation with the tapered connection part 21.

When a sufficient amount of grease has been forced into the grease fitting 20 the operator cuts off the pressure on the grease gun and the coupling device is then easily removed. It will be seen that the operator, by exerting a slight pressure on the coupling device can slide the device slightly downward against the tapered connection part 21 of the grease fitting 20, thereby releasing the jaws 17 from their gripping position held when the grease in the chamber was under pressure.

What I claim is:—

In a device of the class described, a casing having a central opening in one end thereof, a cap threaded over the other end of said casing, a connecting member centrally positioned upon said cap, said connecting member and said cap each having a central opening, said casing having an inner chamber, a coil spring positioned within said chamber, a piston member in said chamber, said coil spring being under compression and having one end resting upon the inner surface of said threaded cap and its other end positioned against said piston, said piston member formed with a central channel therein, a dome shaped end formed on said piston member, a pliable cup shaped member fitting over said dome shaped end and having a central opening, a guide member having a central opening positioned over said pliable cup shaped member, said central channel in said piston member having a saucer shaped recess formed on its outer end, a plurality of oppositely disposed and inwardly tilting jaws positioned within said chamber between said guide member and the inner end of said casing for the purpose of gripping a tapered grease fitting when the chamber is filled with grease under pressure.

RALPH D. THOMPSON.